(12) United States Patent
Wang

(10) Patent No.: US 8,113,755 B2
(45) Date of Patent: Feb. 14, 2012

(54) SCREW STRUCTURE WITH STOP RING

(75) Inventor: Ting-Jui Wang, Sindian (TW)

(73) Assignee: DTech Precision Industries Co. (TW)

( * ) Notice: Subject to any disclaimer, the term of this patent is extended or adjusted under 35 U.S.C. 154(b) by 0 days.

(21) Appl. No.: 12/549,409

(22) Filed: Aug. 28, 2009

(65) Prior Publication Data

US 2009/0317208 A1  Dec. 24, 2009

Related U.S. Application Data

(63) Continuation-in-part of application No. 12/032,748, filed on Feb. 18, 2008, now Pat. No. 7,703,200.

(51) Int. Cl.
*F16B 21/00* (2006.01)
(52) U.S. Cl. ........................ 411/352; 411/999
(58) Field of Classification Search ................... 411/353, 411/352, 999, 107
See application file for complete search history.

(56) References Cited

U.S. PATENT DOCUMENTS

| | | | | | |
|---|---|---|---|---|---|
| 1,251,676 A | * | 1/1918 | McCaffray | .................... | 411/368 |
| 1,472,405 A | * | 10/1923 | Amberton | ......................... | 285/2 |
| 2,201,793 A | * | 5/1940 | Sanborn | ........................ | 292/251 |
| 2,922,456 A | * | 1/1960 | Kann | .............................. | 411/353 |
| 3,059,736 A | * | 10/1962 | Boyd | ................................. | 403/7 |
| 3,180,389 A | * | 4/1965 | Frank | .............................. | 411/350 |
| 3,465,803 A | * | 9/1969 | Swanstrom et al. | .......... | 411/349 |
| 3,996,634 A | * | 12/1976 | Grind | ............................. | 114/352 |
| 4,387,497 A | * | 6/1983 | Gulistan | ........................ | 29/511 |
| 4,447,183 A | * | 5/1984 | Yunt | ............................. | 411/80.5 |
| 4,915,557 A | * | 4/1990 | Stafford | ........................ | 411/107 |
| 5,244,325 A | * | 9/1993 | Knohl | ............................. | 411/353 |
| 6,095,736 A | * | 8/2000 | Miller et al. | .................. | 411/352 |
| 6,682,282 B2 | * | 1/2004 | Allen | ............................. | 411/353 |
| 6,761,521 B2 | * | 7/2004 | McCormack et al. | ......... | 411/353 |
| 6,814,530 B2 | * | 11/2004 | Franco et al. | ................. | 411/353 |
| 6,955,512 B2 | * | 10/2005 | Allen et al. | .................... | 411/353 |
| 2009/0202319 A1 | * | 8/2009 | Wang et al. | .................... | 411/353 |

* cited by examiner

*Primary Examiner* — Flemming Saether
(74) *Attorney, Agent, or Firm* — Schmeiser, Olsen & Watts, LLP

(57) ABSTRACT

A screw structure with a stop ring includes a screw, a ferrule, and a stop ring. The stop ring is fitted on a threaded shank of the screw to push against a front end of the ferrule, so that the ferrule is pressed against a head of the screw. With the ferrule being firmly pressed against the head of the screw by the stop ring, the ferrule will not sway relative to the screw, allowing the screw structure to be stably sucked with a sucking tool and be highly accurately assembled to a printed circuit board.

9 Claims, 10 Drawing Sheets

SCREW STRUCTURE WITH STOP RING

CROSS-REFERENCE TO RELATED APPLICATIONS

This application is a continuation-in-part patent application of U.S. application Ser. No. 12/032,748 filed on 18 Feb. 2008, the entire contents of which are hereby incorporated by reference for which priority is claimed under 35 U.S.C. §120.

FIELD OF THE INVENTION

The present invention relates to a screw structure, and more particularly to a screw structure with a stop ring that provides enhanced stability during the process of assembling the screw structure to a printed circuit board (PCB).

BACKGROUND OF THE INVENTION

FIG. 1 shows a conventional screw for using with a printed circuit board (PCB). The screw 5 includes a head 51, a threaded shank 52, and a ferrule 53 having a free end with an axially extended toothed flange 531. The ferrule 53 normally encloses the threaded shank 52 and is retractable into the head 51 under pressure to expose the threaded shank 52, as shown in FIG. 2. To assemble the screw 5 to a PCB 7, first align the ferrule 53 with a through hole 71 provided on the PCB 7, as shown in FIG. 3. Then, apply a downward force on the screw head 51, so that the toothed flange 531 of the ferrule 53 is pressed into the through hole 71, as shown in FIG. 4. And, keep applying the downward force until the toothed flange 531 is completely fitted in the through hole 71 to connect the screw 5 to the PCB 7, as shown in FIG. 5.

While the screw 5 is assembled to the through hole 71 on the PCB 7 in the above-described manner, the following disadvantages exist:

(a) When assembling the screw 5 to the PCB 7, the ferrule 53 is directly aligned with the through hole 71. However, since the head 51 and the ferrule 53 could not be held together through compression during assembling, the ferrule 53 and the head 51 tend to move relative to each other due to the small clearance existed between them. As a result, the ferrule 53 is frequently misaligned with the through hole 71.

(b) Since the screw 5 is very small in volume and the through hole 71 has a relatively small diameter, the alignment of the flange 531 on the ferrule 53 of the screw 5 with the through hole 71 is easily subject to error, preventing the flange 531 on the ferrule 53 from being successfully aligned with the through hole 71 and resulting in a poorly packaged or even a damaged PCB 7.

(c) In the event the flange 531 of the ferrule 53 is not pressed into the through hole 71 in one single operation, the flange 531 tends to be incompletely fitted in the through holes 71 and become deviated or skewed due to inaccurate planeness of the PCB 7.

(d) To assemble the screw 5 to the PCB 7 by pressing the toothed flanges 531 of the ferrules 53 into the through holes 71, the screw 5 is individually fetched to the PCB 7. Therefore, the assembly of a large amount of screws 5 to the PCB 7 could not be efficiently carried out using the surface mount technology (SMT) that has been widely employed in the electronic industrial field.

SUMMARY OF THE INVENTION

A primary object of the present invention is to provide a screw structure with a stop ring, so that the screw structure can be packaged to have a fixed height. That is, every component of the screw structure are restricted to a fixed position, allowing the screw structure to have a fixed center of gravity without the risk of swaying easily. Therefore, the screw structure can be stably sucked with a sucking tool and then easily but accurately positioned on a PCB without becoming deviated and skewed.

To achieve the above and other objects, the screw structure with the stop ring according to the present invention includes a screw having a head and an externally threaded shank forward extended and projected from the head; a ferrule enclosing the threaded shank; and a stop ring removably fitted on the threaded shank to push against a front end of the ferrule for the latter to rearwardly press against the head of the screw.

According to an operable embodiment of the present invention, the screw structure further includes a spring fitted around the threaded shank with an end of the spring pressed against an inner side of the head and another end pressed against a rear end of the ferrule.

In a preferred embodiment of the present invention, the stop ring can be an O-ring or a nut.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
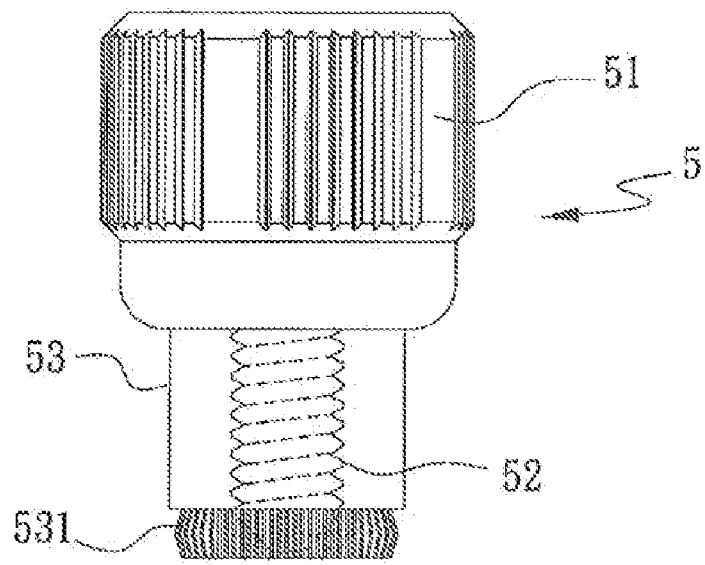
FIG. 1 shows a conventional screw with a ferrule thereof in an extended position.
Figure 2:
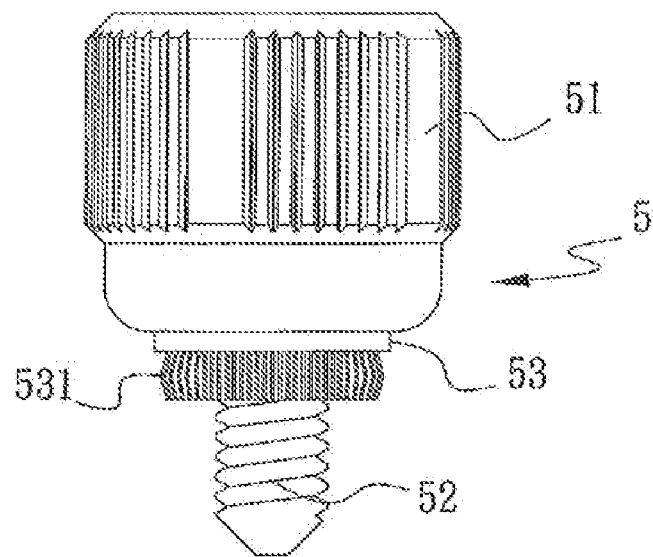
FIG. 2 shows the conventional screw of FIG. 1 with the ferrule thereof in a retracted position.
Figure 3:
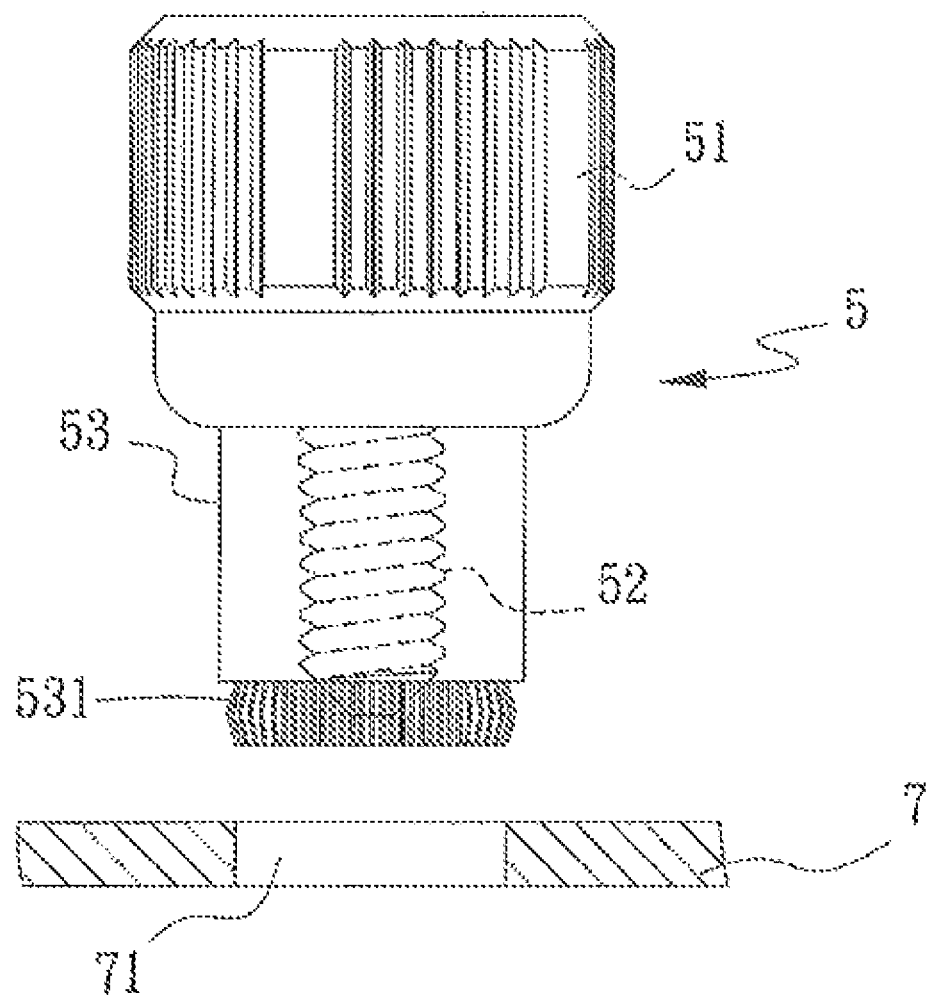
FIGS. 3 to 5 show the process of assembling the conventional screw of FIG. 1 to a PCB.
Figure 4:
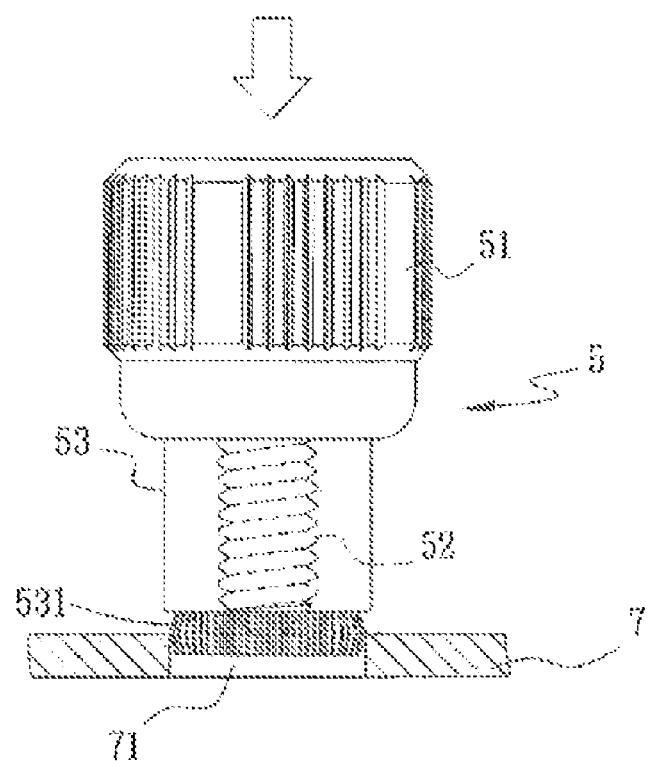
Figure 5:
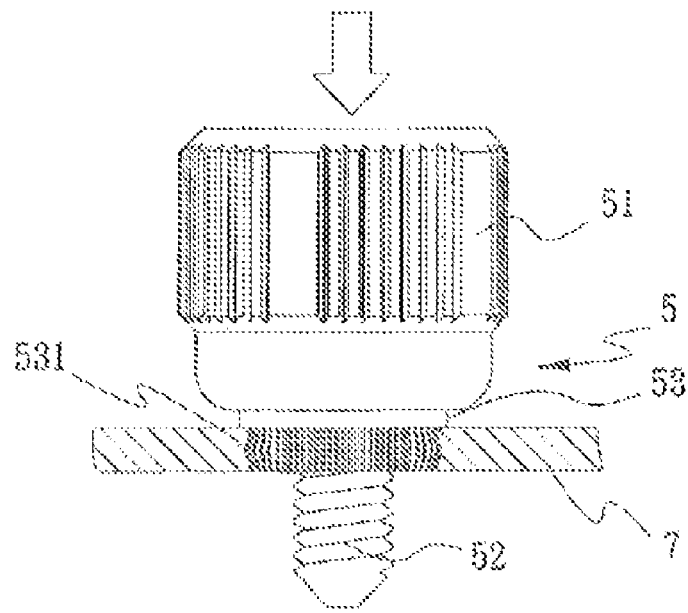
Figure 6:
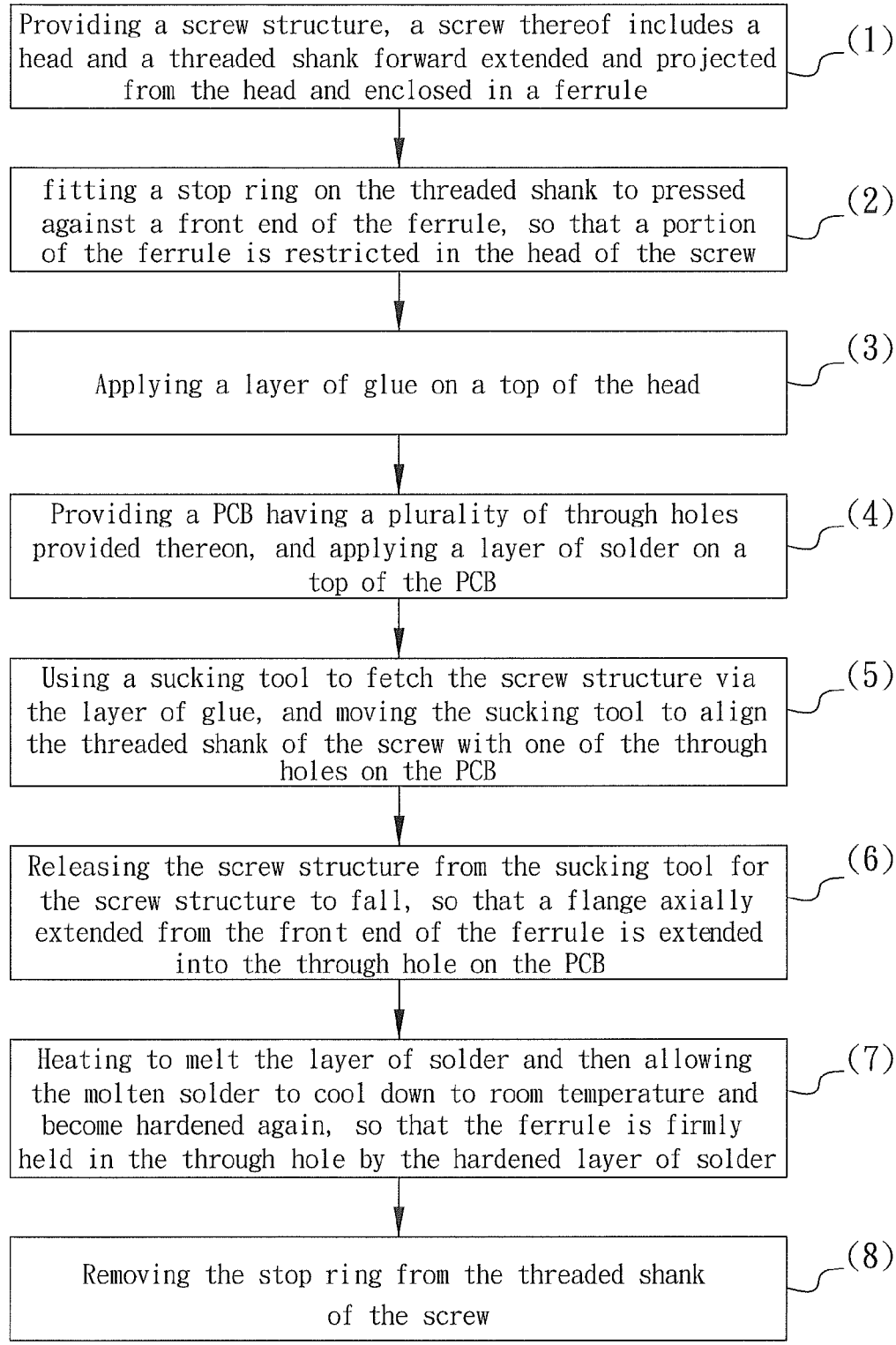
FIG. 6 is a flowchart showing the steps of assembling a screw structure according to an embodiment of the present invention to a PCB.
Figure 7A:
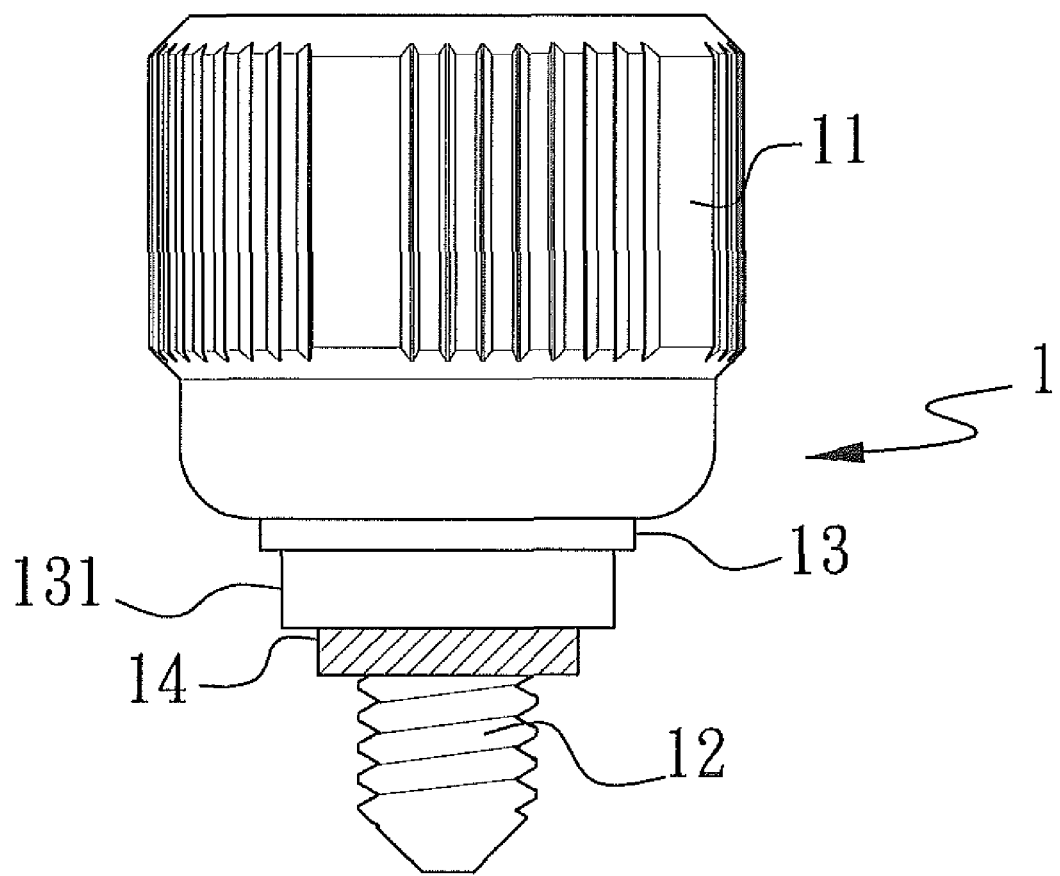
FIG. 7A is an assembled perspective view of a screw structure with a stop ring according to an embodiment of the present invention.
Figure 7B:
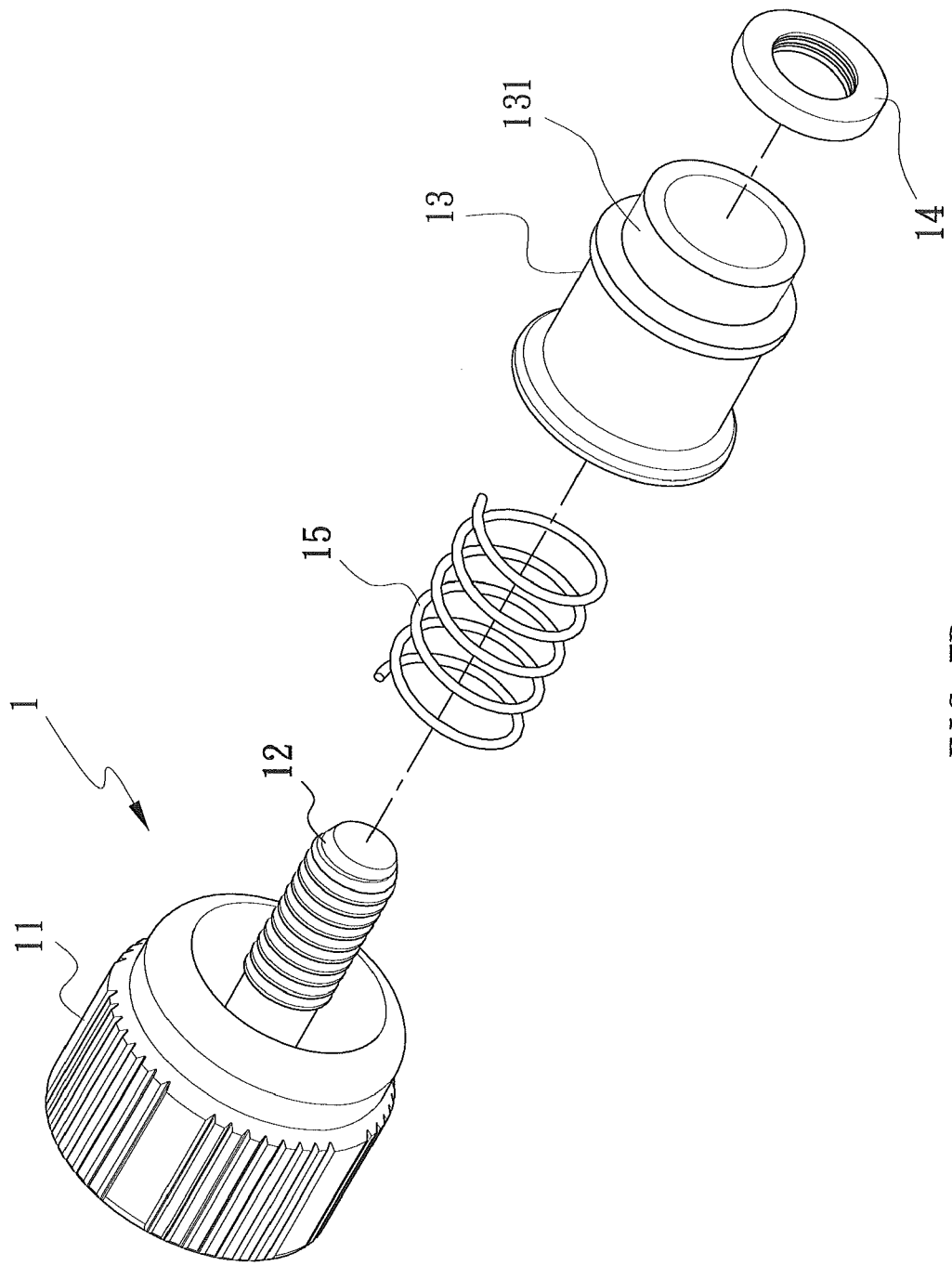
FIG. 7B is an exploded view of FIG. 7A.

Before describing the screw structure of the present invention in details, a manner of assembling the screw structure to a printed circuit board (PCB) is explained first. Please refer to FIG. 6 that is a flowchart showing the steps of assembling the screw structure of the present invention to a PCB. As shown, the assembling steps include:

(1) Providing a screw structure. As can be seen in FIGS. 7A and 7B, the screw 1 includes a head 11 and a threaded shank 12 forward extended and projected from an inner side of the head 11, and a ferrule 13 enclosing the threaded shank 12.

And, in a preferred embodiment, the screw structure further includes a spring 15 having an end pressed against the inner side of the head 11 and another end pressed against a rear end of the ferrule 13. With the spring 15, the ferrule 13 is elastically retractable into or extendable from the head 11.

(2) Fitting a stop ring 14 on the threaded shank 12 to press against a front end of the ferrule 13, so that a portion of the ferrule 13 is restricted in the head 11, as can be seen in FIG. 7A. The stop ring 14 can be an O-ring or a nut.

Figure 8:
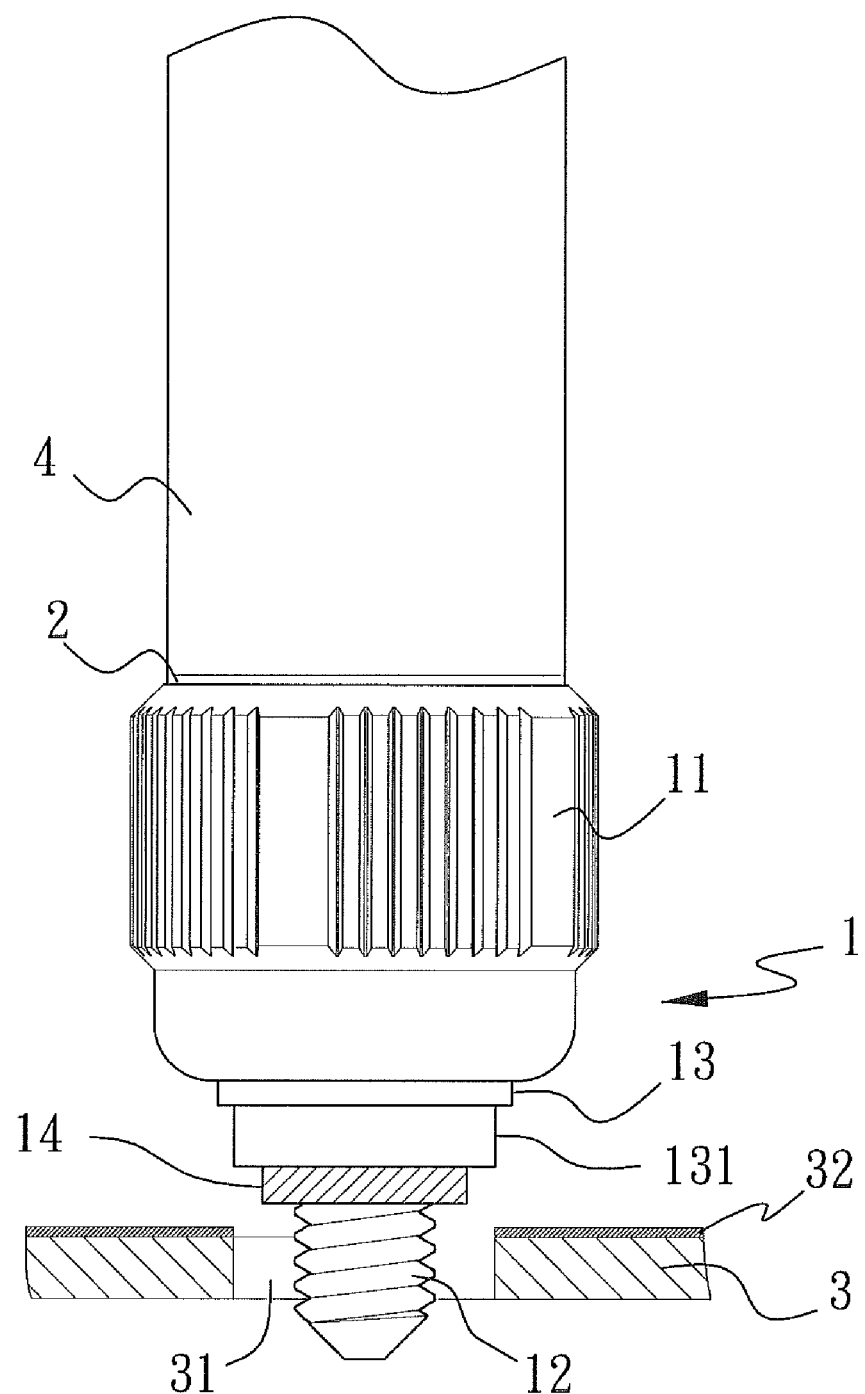
FIG. 8 shows a threaded shank of the screw structure with a stop ring of the present invention is aligned with a through hole provided on a PCB.

(3) Applying a layer of glue 2 on a top of the head 11 of the screw 1, as can be seen in FIG. 8.

(4) Providing a PCB 3 having a plurality of through holes 31 formed thereon, and applying a layer of solder 32 on a top of the PCB 3, as can be seen in FIG. 8

(5) Using a sucking tool 4 to fetch the screw structure via the layer of glue 2, and then moving the sucking tool 4 to align the threaded shank 12 of the screw 1 with one of the through holes 31 on the PCB 3 while a distance about 0.4 mm is left between the front end of the ferrule 13 and the through hole 31, as can be seen in FIG. 8. The sucking tool 4 can be a vacuum sucking tool.

Figure 9:
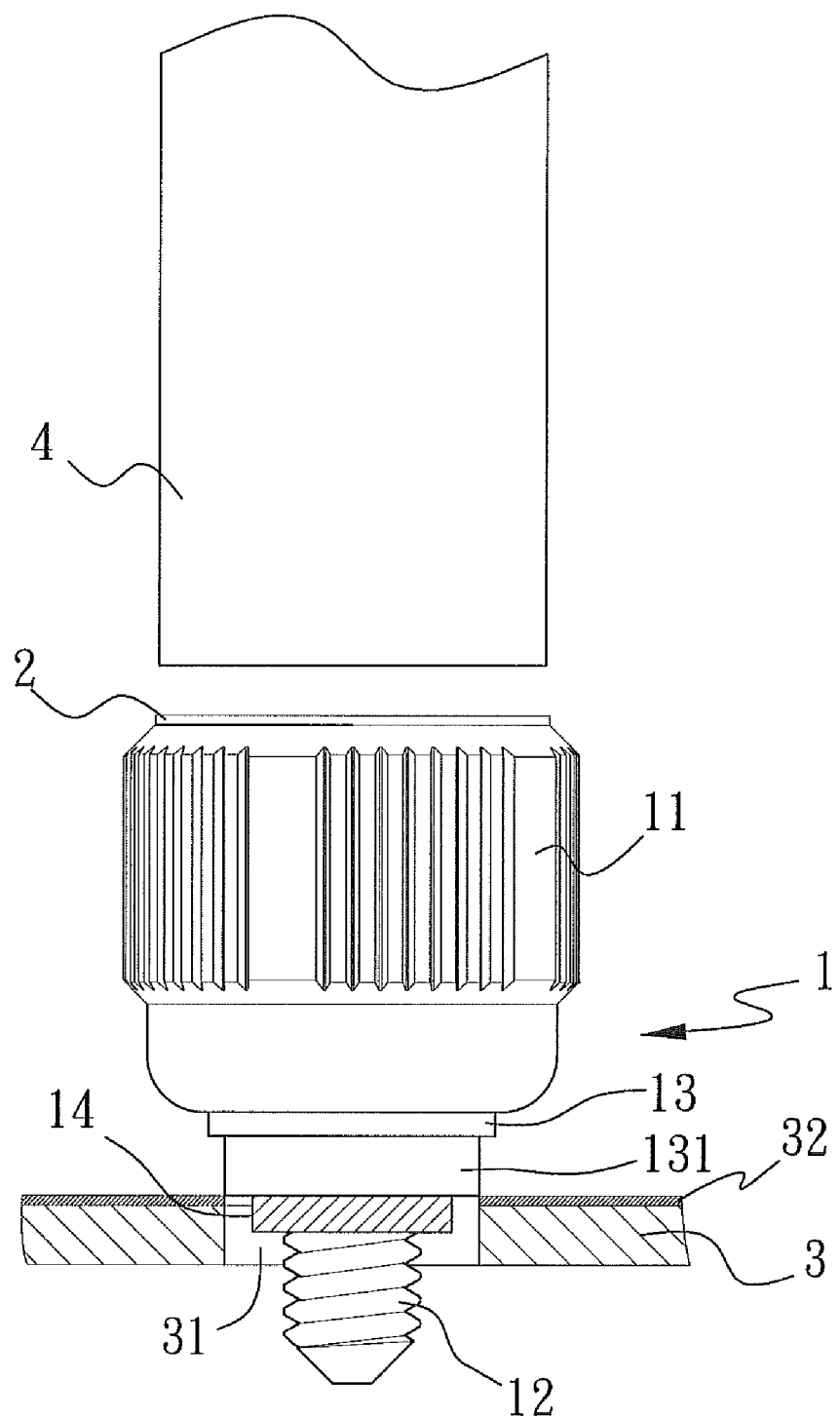
FIG. 9 shows the screw structure of the present invention is released from a sucking tool.

(6) Releasing the screw structure from the sucking tool 4 for the screw structure to fall, so that a flange 131 axially forward extended from the front end of the ferrule 13 is extended into the through hole 31, as can be seen in FIG. 9.

Figure 10:
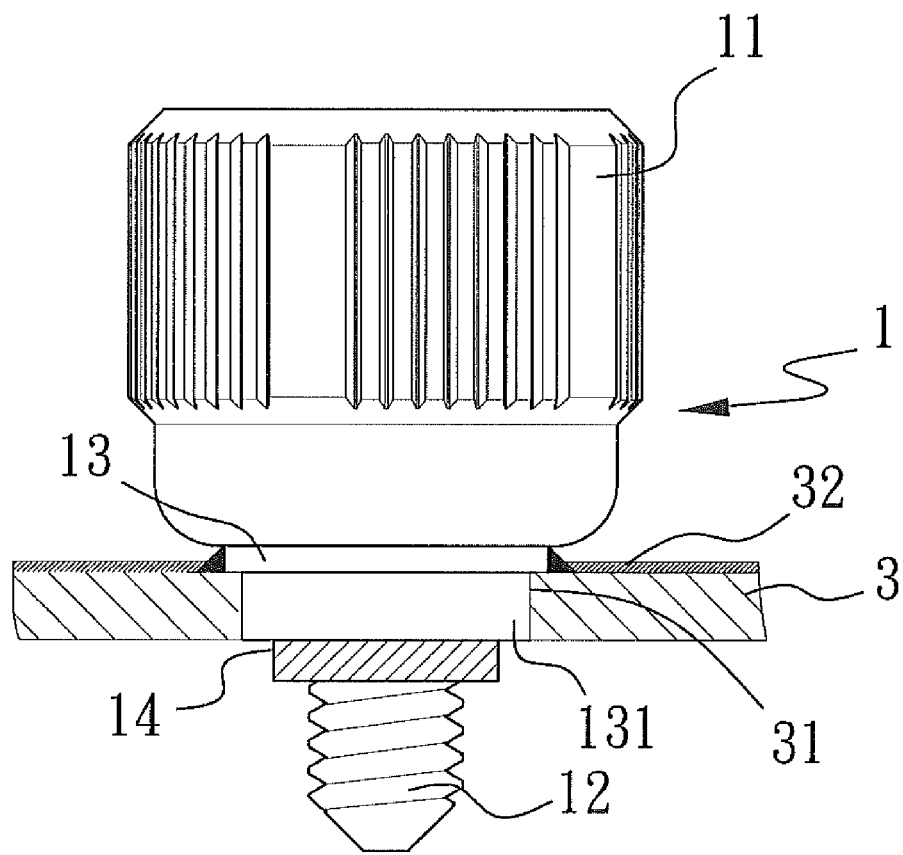
FIG. 10 shows a flange axially forward extended from a ferrule of the screw structure of the present invention is stably positioned in the through hole on the PCB.

(7) Heating to melt the layer of solder 32, and then allowing the molten solder 32 to cool down to room temperature and become hardened again, so that the ferrule 13 is fixedly held in the through hole 31 by the hardened layer of solder, as can be seen in FIG. 10.

Figure 11:
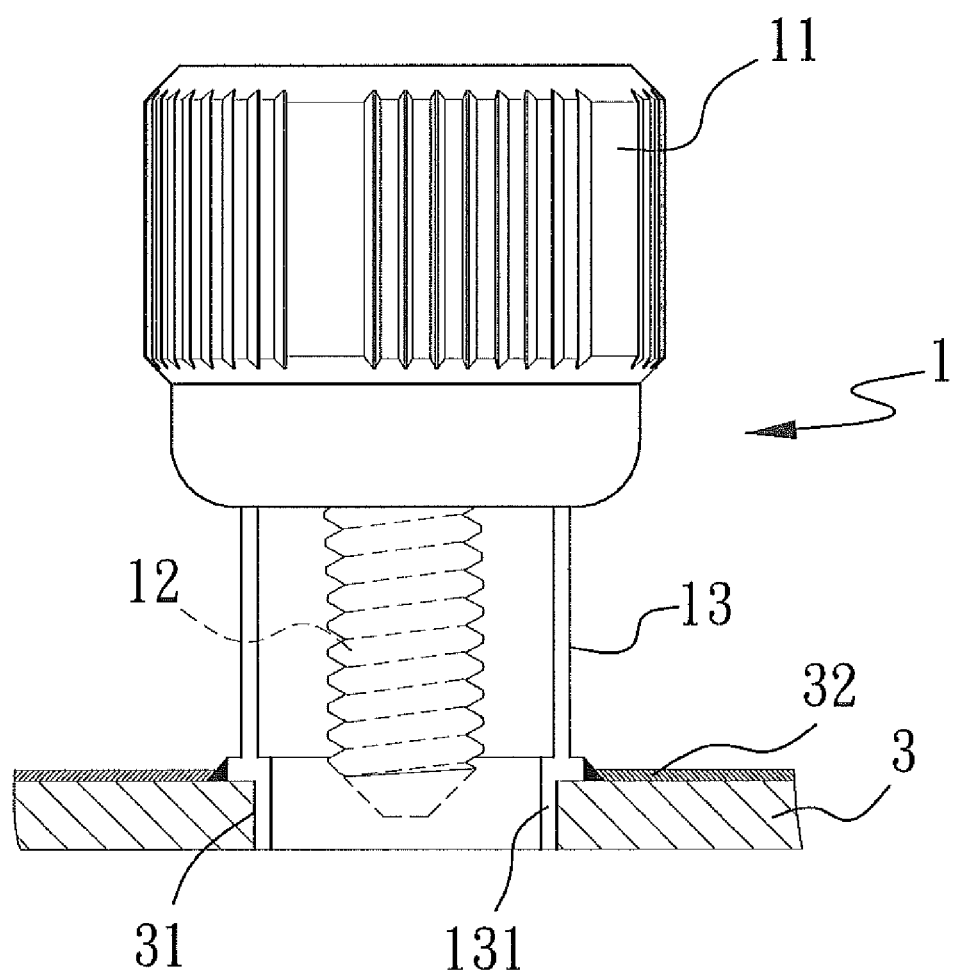
FIG. 11 shows the stop ring is removed from the screw structure of the present invention and a head of the screw is sprung upward to retract the threaded shank into the ferrule.

(8) Removing the stop ring 14 from the threaded shank 12. At this point, the head 11 is sprung rearward by an elastic restoring force of the spring 15, bringing the threaded shank 12 to retract into the ferrule 13, as can be seen in FIG. 11.

The above steps describe one of the manners of assembling the screw structure of the present invention to a PCB. Please refer to FIGS. 7A and 7B. For the screw structure to be easily but accurately assembled to a PCB without becoming deviated and skewed, the screw structure according to a preferred embodiment of the present invention includes a screw 1, a ferrule 13, a spring 15, and a stop ring 14. The screw 1 includes a threaded shank 12 and a head 11. The threaded shank 12 has a front end being externally threaded. The ferrule 13 defines a central bore and can therefore enclose the threaded shank 12. The spring 15 is fitted around the threaded shank 12 with an end pressed against an inner side of the head 1 and another end pressed against a rear end of the ferrule 13. The stop ring 14 is fitted on the threaded shank 12 at a predetermined position to push against a front end of the ferrule 13 and compress the spring 15, so that the ferrule 13 and the spring 15 are rearward pressed against the inner side of the head 11.

The stop ring 14 can be an O-ring or a nut. In the embodiment illustrated in FIG. 7B, the stop ring 14 is a nut internally provided with a thread for meshing with the threaded shank 12.

With the stop ring 14 fitted on the threaded shank 12 at a predetermined position thereof, a part of the ferrule 13 is restricted from projecting from the head 11, so that the threaded shank 12 of the screw 1 is partially exposed from the front end of the ferrule 13, and the screw structure is packaged to have a fixed height. That is, with the stop ring 14, all the components of the screw structure of the present invention can be restricted to a fixed position when the screw structure is being assembled to the PCB.

In summary, the present invention utilizes a stop ring to enable the screw structure to be packaged to have a fixed height for assembling to the PCB, allowing the screw structure to have a fixed center of gravity without the risk of swaying easily. Therefore, the screw structure can be easily but accurately positioned in the through hole on the PCB without becoming deviated and skewed to overcome the drawbacks in the conventional screw.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A screw structure with a stop ring, comprising:
a screw including a head and a threaded shank forward extended and projected from the head;
a ferrule enclosing the threaded shank; and
a temporarily-fitted stop ring being fitted on the threaded shank to push against a front end of the ferrule, so that the ferrule is rearward pressed against the head of the screw, wherein the ferrule is fixed to a through-hole of a printed circuit board by soldering and the temporarily-fitted stop ring is removable fixed only to the screw and ferrule.

2. The screw structure as claimed in claim 1, wherein the screw structure further includes a spring; the spring being fitted around the threaded shank with an end of the spring pressed against an inner side of the head and another end pressed against a rear end of the ferrule.

3. The screw structure as claimed in claim 1, wherein the stop ring is selected from the group consisting of an O-ring and a nut.

4. A screw structure, comprising:
a screw including a head and a threaded shank forward extended and projected from the head;
a ferrule enclosing the threaded shank, said ferrule adapted for fixed engagement to a through-hole of a printed circuit board by soldering; and
a temporarily-fitted stop ring being fitted on the threaded shank to push against a front end of the ferrule, so that the ferrule is rearward pressed against the head of the screw, wherein the ferrule is fixed to a through-hole of a printed circuit board by soldering and the temporarily-fitted stop ring is removable fixed only to the screw and ferrule.

5. The screw structure as claimed in claim 4, wherein the screw structure further includes a spring; the spring being fitted around the threaded shank with an end of the spring pressed against an inner side of the head and another end pressed against a rear end of the ferrule.

6. The screw structure as claimed in claim 4, wherein the stop ring is selected from the group consisting of an O-ring and a nut.

7. A screw structure, comprising:
a screw including a head and a threaded shank forward extended and projected from the head;
a ferrule enclosing the threaded shank; and
a temporarily-fitted stop ring being fitted on the threaded shank to push against a front end of the ferrule, so that the ferrule is rearward pressed against the head of the screw to maintain a pre-determined height from the top of said screw head to the bottom of said ferrule, wherein the ferrule is fixed to the through-hole of the printed circuit board by soldering and the temporarily-fitted stop ring is removable fixed only to the screw and ferrule.

8. The screw structure as claimed in claim 7, wherein the screw structure further includes a spring; the spring being fitted around the threaded shank with an end of the spring pressed against an inner side of the head and another end pressed against a rear end of the ferrule.

9. The screw structure as claimed in claim 7, wherein the stop ring is selected from the group consisting of an O-ring and a nut.

* * * * *